(12) United States Patent
Wyczalkowski et al.

(10) Patent No.: US 6,464,227 B1
(45) Date of Patent: Oct. 15, 2002

(54) MANOMETRIC FLUID BARRIER SEAL

(75) Inventors: Wojciech R. Wyczalkowski, Harrisburg; Steven C. Roselle, Palmyra; Robert Peter Dowd, Lebanon; Ronnie G. Thompson, Annville; Ravi K. Sharma, Palmyra, all of PA (US)

(73) Assignee: Philadelphia Gear Corporation, King of Prussia, PA (US)

( * ) Notice: Subject to any disclaimer, the term of this patent is extended or adjusted under 35 U.S.C. 154(b) by 0 days.

(21) Appl. No.: 09/884,604

(22) Filed: Jun. 19, 2001

(51) Int. Cl.[7] ............................... F16J 15/40
(52) U.S. Cl. ..................................... 277/42.8
(58) Field of Search ................. 277/419, 428

(56) References Cited

U.S. PATENT DOCUMENTS

| | | | |
|---|---|---|---|
| 2,379,648 A | * | 7/1945 | Meyers |
| 3,246,901 A | * | 4/1966 | Wickli ........................ 277/428 |
| 4,210,614 A | * | 7/1980 | Kleimola |
| 4,647,215 A | | 3/1987 | Armitage et al. |
| 6,139,294 A | | 10/2000 | Haller |
| 6,142,478 A | | 11/2000 | Pecht et al. |

* cited by examiner

Primary Examiner—Robert J. Sandy
Assistant Examiner—Karlena D. Schwing
(74) Attorney, Agent, or Firm—Duane Morris LLP

(57) ABSTRACT

A fluid seal having differing fluid levels is provided on opposite sides of a downwardly opening cup-shaped container that is longitudinally lapped by an upwardly opening annular container that is sealed to a vessel such that the lip of the cup-shaped container is submerged. The fluid seal creates a hydrostatic pressure barrier between ambient and a vessel, for example at a rotating vertical shaft. Relatively high speeds are permitted without leakage due to a number of internal horizontal and vertical baffles on one or more walls of the annular container. Barrier fluid losses due to evaporation or the like can be replaced in an embodiment wherein condensed process fluid is used as the barrier fluid, and wherein excess barrier fluid is returned to the vessel while maintaining a differential pressure barrier via the seal.

18 Claims, 3 Drawing Sheets

PRIOR ART

MANOMETRIC FLUID BARRIER SEAL

BACKGROUND OF THE INVENTION

1. Field of the Invention

The invention relates to fluid barrier seals that maintain a vapor barrier between relatively movable parts. An exemplary application is a seal between a vessel wall and a substantially vertical impeller shaft of a rotational mixing apparatus.

2. Prior Art

An element that traverses the wall of a closed vessel can have a vapor tight seal between the element and the vessel, even though one may be stationary while the other is movable. For this purpose, a quantity of liquid can be arranged to occupy the space between the relatively movable parts, thereby providing a hydrostatic or liquid barrier separating the vapor in the vessel from the ambient atmosphere. The liquid flows as needed to conform to the space between the parts. There are various possible applications for such a seal. In this disclosure, a liquid barrier seal is applied to sealing between a mixer vessel or the like and a vertical impeller shaft that traverses the wall of the vessel. The invention is applicable to other similar applications as well.

Such a seal can be made to withstand a difference in pressure between the inside of the vessel and the ambient air outside. In one arrangement, a downwardly opening cup-shaped cylinder is attached and sealed to the part traversing the vessel wall, for example a rotating vertical impeller shaft. The downwardly opening cup-shaped cylinder extends axially downward, and axially overlaps an upwardly opening annular cylinder that is attached and sealed to the vessel. The annular cylinder contains a barrier fluid that seeks its lowest level due to gravity, residing in the bottom of annular space provided. The downwardly opening cup-shaped cylinder is positioned with its lip extending downward into the annular cylinder, below the surface of the barrier fluid in the annular cylinder. The downwardly opening cup-shaped cylinder (with the impeller) and the upwardly open annular cylinder (on the vessel) are relatively rotatable. A vapor seal is maintained by the barrier fluid, which occupies the spaces between the axially coextensive and radially interleaved walls of the annular cylinder and the downwardly opening cup-shaped cylinder, respectively.

Differential pressure between the vessel and the ambient causes the level of the barrier fluid to differ between the inside and outside of the cup-shaped cylinder, in the manner of a manometer or pressure gauge, hence the name "manometric" seal. The difference in height of the fluid levels, and the maximum difference permitted by the extent of cup/cylinder submergence determines maximum pressure difference between ambient and closed vessel. In a static sense, the pressure difference must present a force that is less than the force that could displace the fluid from the space between the relatively movable parts. In a dynamic sense the matter is influenced by the rate of relative rotation, which induces turbulence.

The foregoing subject matter is discussed herein with respect to the example of a vertical shaft in a vessel, wherein a vertically oriented cup-shaped cylinder fits into an annular cylinder, so as to provide radially interleaved, axially overlapping walls. The axis need not be precisely vertical for such a seal to function. The same considerations apply, for example, to arrangements having inclined axes wherein there is a vertical component over which cup-shaped and annular cylinders or similar structures may overlap over a span that is occupied by the barrier fluid and has at least some vertical extension.

Manometric seals are most applicable as vapor/gas seals in relatively slow rotating mixing equipment because the extent to which the liquid barrier can bear a pressure difference is not complicated by turbulence. The basic components of a typical seal are shown in FIG. 1, labeled "Prior Art." A downwardly opening cup-shaped cylinder 1 is connected and sealed to a rotating shaft 2. Thus the cup-shaped cylinder rotates with the shaft. A stationary upwardly-opening cylinder or annular container 3 contains a barrier fluid 4 that seeks its lowest level due to gravity. If there is a difference in pressure within and without of the vessel, the difference appears as a difference in the fluid level in the annular container 3 on either side of the downwardly opening cup-shaped cylinder 1. The pressure difference produces a fluid head.

Referring to FIG. 1, vessel internal pressure bears on barrier liquid surface 6 inside of the downwardly opening cup-shaped cylinder 1. Ambient pressure acts on barrier fluid surface 5 on the outside of cup-shaped cylinder 1. The cup-shaped cylinder rotates with the shaft 2, whereas the annular container 3 is stationary.

When the shaft is not rotating or at low rotating speeds, the liquid surface is undisturbed. The inside/outside pressure differential can vary, moving the positions of inside and outside fluid surfaces 5, 6 so that one or the other is higher or lower. The seal fails (leaks) in that case if the pressure differential becomes sufficient to force the level of fluid surfaces 5 or 6 all the way down to the level of the bottom lip of the downwardly opening cup-shaped cylinder.

With rotation of the cup-shaped cylinder 1, fluid adjacent to the surface of the cup-shaped cylinder tends to be carried along with the rotating cylinder by friction, while fluid adjacent to the stationary surfaces of the annular cylinder is retarded by friction. The shear is such that surfaces 5, 6 can become turbulent. Vortices 9 can be generated, resulting in the formation of discrete bubbles that are spread throughout the barrier fluid volume. Any bubbles 10 that are formed on one radial side or the cup-shaped rotating cylinder 10 and migrate to the other side, may be carried to the surface by their buoyancy, where their vapor contents is released. Gas (vapor) that is released by such bubbles is a form of leakage passing the fluid barrier seal.

In view of the possibility of leakage as described, for proper seal operation the cylinder tangential speed should not exceed a limit of about 4.5 m/s (900 ft/min) for a barrier fluid having the viscosity characteristics of water. At or near this limit, it is appropriate to provide a series of axially extending baffles 11 protruding radially inwardly from the outer stationary wall of the annular cylinder. At even higher rotating speeds and/or in the absence of the circumferential obstruction presented by such baffles, substantially all the barrier fluid can be put into rotation together with the downwardly opening cup-shaped cylinder, leading to turbulence that disrupts seal operation completely.

The differential pressure limit for a manometric seal depends on the density of the barrier liquid and the dimensions of the seal, such as axial height of the seal. These aspects determine the mass of fluid displacement at the maximum fluid level difference on the radially opposite sides of the downwardly opening cup-shaped cylinder. For practical reasons the height of a seal as described seldom exceeds 1 m (3 ft).

The barrier fluid must be compatible with any process media that will contact the barrier fluid. The barrier fluid preferably has a low viscosity to limit power consumption. In many applications water is a possible choice, but for water and other often-volatile low viscosity liquids, evaporation may be a drawback.

It would be advantageous to increase the possible tangential velocity range of a manometric seal. It would also be advantageous to do so in a seal that can employ low viscosity barrier fluid, while controlling the problem of evaporation.

SUMMARY OF THE INVENTION

According to an aspect of the present invention, it has been found that the useful range of tangential cylinder speed of a manometric seal can be increased to over 10 m/s (2000 ft/min) by use of a combination of vertical and horizontal baffles on one or preferably both of the surfaces of the stationary annular cylinder that face the cup-shaped rotation cylinder of the seal. The vertical baffles extend axially and radially to provide obstructions in a circumferential direction. These baffles prevent the barrier fluid from rotating, and reduce the formation of vortices that could disrupt seal operation. Furthermore, horizontal baffles extend circumferentially and radially, and reduce the vertical mobility and mixing efficiency of the barrier fluid. The horizontal baffles greatly reduce the number of small gas bubbles that reach the bottom lip of the downwardly opening cup-shaped cylinder and potentially pass under the seal bottom and result in leakage.

Shaft work and frictional heating of the barrier fluid dissipate the energy that is released in a rotating seal element. It is an aspect of the invention to optimize the structure of the container for the barrier fluid so as to reduce mixing, turbulence and consequent gas bubble generation. Full scale testing has suggested that energy dissipation in a high-speed seal as described should be keep below 6 W/kg (30 Hp/1000 gal).

It is another aspect of invention to eliminate evaporation losses so that the seal is substantially maintenance free and it is generally not necessary to "top off" the barrier fluid level in the seal. This is accomplished in one embodiment by using process liquid as a barrier fluid. If conditions allow, a process fluid's vapor is condensed and returned to the seal. Excess barrier fluid is put back in to vessel through U-pipe liquid locks.

DETAILED DESCRIPTION OF THE PREFERRED EMBODIMENTS

Figure 1:
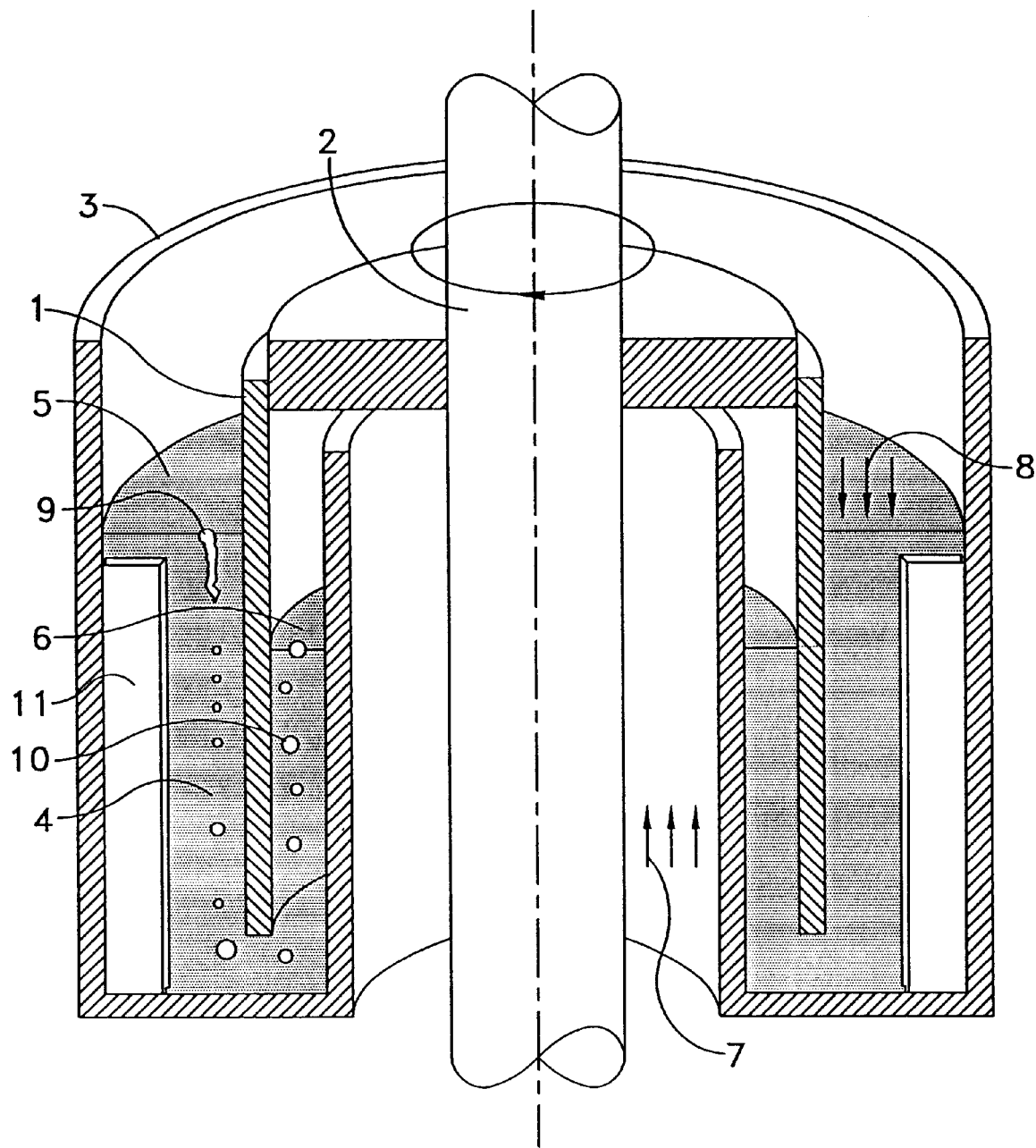
FIG. 1 is a perspective view of a standard rotary manometric seal
Figure 2:
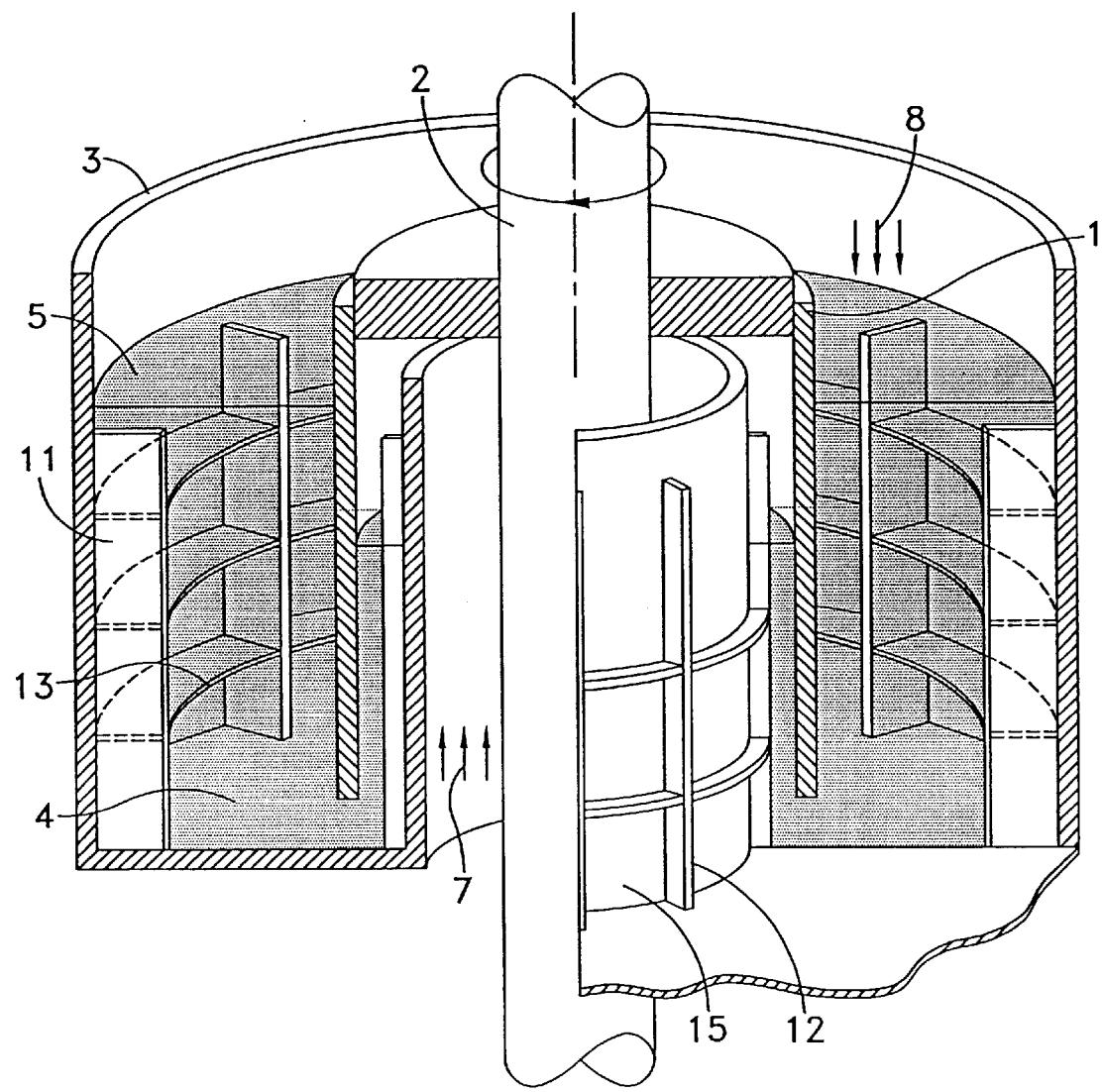
FIG. 2 is a perspective view of a high-speed rotary manometric seal according to the invention.

As shown in FIG. 2, an inventive rotating manometric seal capable of operation without substantial leakage at relatively high rotation speeds, comprises a rotating cylinder 1, which is open at its bottom, sealed at its top to a shaft 2. This downwardly-opening cylinder 1 fits into the radial space between the walls of an annular upwardly-opening stationary container 3, which space is filled to a predetermined level with a barrier fluid 4. Rotating cylinder 1, fluid 4 and container 3 together define a pressure barrier separating an internal vessel volume at an internal pressure 7 from an ambient volume at an external pressure 8, which pressures can be the same or different and also may be variable from time to time.

Shaft 2 and cup-shaped cylinder 1 thereon are rotatable relative to annular container 3. The direction of relative rotation may be clockwise or counter clockwise. It is also conceivable that the shaft 2 and cup-shaped cylinder 1 can be axially or longitudinally movable relative to annular container 3. However, it is necessary when maintaining a vapor barrier using the seal that the lower edge or lip of the downwardly opening cup-shaped cylinder 1 must remain below the surface of the barrier fluid 4 carried in annular container 3 and urged by gravity to seek its lowest level.

The liquid level on the internal (vessel) and external (ambient) sides of the rotating cylinder 1 becomes different to reflect differences between the external pressure 8 and internal pressure 7. Specifically, the pressure difference translates to a fluid head. The axial height of the seal, and the vertical depth of immersion of the lower lip of cup-shaped cylinder 1 in annular container 3, is designed together with the amount of fluid carried in container 3 to accommodate differential pressure requirements. At the maximum pressure differential the lop of cup-shaped cylinder 1 remains below the surface of barrier fluid 4 on the higher pressure (lower level) side of the seal.

At high tangential speed, friction causes agitation of barrier fluid 4. According to an inventive aspect, rotation and possible spinning and/or vortexing and eddies in the barrier fluid 4 are minimized by providing the stationary container 3 with baffles that tend to resist relative motion of the barrier fluid relative to the stationary cylinder of container 3. A minimum of eight vertical baffles 11 are provided on the external wall 14, and a minimum of eight vertical baffles 12 are provided on the internal wall 15.

According to an inventive aspect in the embodiment of FIG. 2, horizontal baffles 13 are also provided. A minimum of two horizontal baffle sets preferably are installed on the internal wall 15 and the external wall 14 of container 3. The horizontal baffles preferably are equally spaced through the barrier fluid height.

Vertical baffles 11 extend parallel to the rotation axis and radially inwardly. Baffles 11 thus present an obstruction that resists the tendency of the barrier fluid 4 to rotate with the cup-shaped cylinder 1. This reduces the tendency to form eddies. The operation of horizontal baffles 13 is less apparent. Horizontal baffles 13 extend circumferentially and radially. The horizontal baffles 13 do not present a substantial obstruction against rotational displacement of the barrier fluid, but instead reduce the mixing efficiency of the arrangement in a vertical direction. Inasmuch as any vapor bubble that form are less efficiently mixed into the barrier fluid that might otherwise occur, the bubble are less inclined to migrate downwardly in the barrier fluid to a position at which the bubbles might pass under the lip of container 1 and be carried upward by their buoyancy on the opposite side of container 1.

Any or all of the baffles, including vertical baffles 11 and horizontal baffles 13, may be sealed continuously up to the adjacent wall or may be spaced from the wall by a distance that permits a small flow of barrier fluid in the direction otherwise blocked by the baffle. For this purpose, the gap between rotating cylinder 1 and vertical baffles 11 preferably is no less than 25 mm (1.0").

Figure 3:
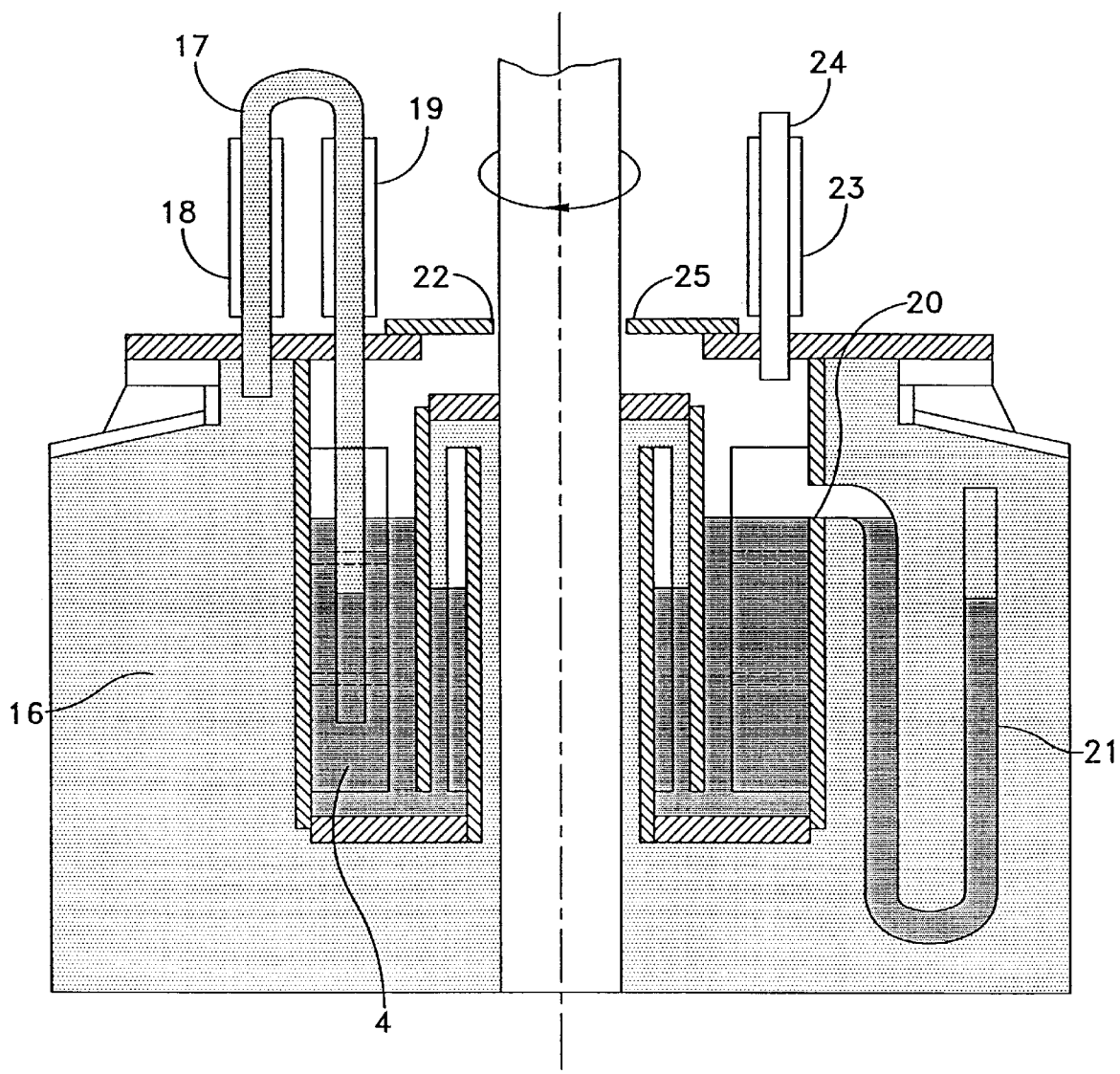
FIG. 3 is a plan view of a condenser and liquid lock according to the invention.

An alternative embodiment of the invention as shown in FIG. 3 comprises a seal arrangement as disclosed, further configured to include a condensate feeding system whereby a process vapor such as steam or water vapor is employed to regulate the level of the barrier fluid in the seal. Condenser pipe 17 defines a conduit in fluid communication with vapor in the vessel (i.e., opening in the vessel above the level of any liquid therein—the liquid not shown). Condenser pipe 17 thus contains a vapor phase or process fluid vapor 16, and preferably forms a downwardly facing U-bend. An inlet part of the condenser pipe 17 that leads into pipe 17 from the vessel volume containing the process vapor is kept relatively warm, as shown for example by insulation 18 at the inlet to pipe 17, which prevents condensation of process vapor in this part of pipe. The downwardly extending portion of the pipe leading into the annular container 3 is kept relatively cooler, for example as shown generally by a cooler 19, which can be a heat exchanger coupled to a keep this part of pipe 17 cool for promoting condensation of process fluid vapor 16. Condensed vapor flows by gravity into the annular seal container 3. Pipe 17 as shown is arranged to discharge in the area of the baffles provided on the wall of annular container 3.

The embodiment shown, comprising insulation 18 on the warm side and a heat exchanger 19 or the cooler condensing side, assumes that the ambient air is relatively cooler and the process vapor is relatively warmer. Other temperature relationships are possible. For example, if the ambient air is warmer than the process vapor, it would be possible to omit insulation 18 or to use a heat exchanger on that side to prevent condensation. Similarly, the heat exchanger 19 on the cooler condensing side could be coupled to a chiller or the like (not shown) to promote condensation that flows into the annular container 3. These temperature relationships also could be constant or could be established occasionally when it is necessary or desirable to recharge the barrier fluid 4.

The outlet side of condenser pipe 17 is submerged in the barrier fluid 4. As shown, condenser pipe 17 is submerged sufficiently to open at a depth lower than the level of the barrier fluid 4 on the radially inner side of the seal, where the barrier fluid is exposed to the internal vessel pressure. This arrangement allows condensed process vapor to recharge the barrier fluid without venting the internal pressure 16 to the ambient. The condenser pipe preferable opens at or near the lowest level of the barrier fluid 4 as determined by the required differential pressure. For example, the condenser pipe 17 can open at the level of the bottom lip of the downwardly opening cup-shaped container 1 that is coupled to the shaft.

Excess barrier fluid 4 is removed from the seal by a trap formed by U-shaped pipe 21. Barrier fluid from the annular container 3 which fills the container up to the level of a weir 20, can flow into the U-shaped trap pipe 21, which opens upwardly. Both sides of U-shaped trap pipe 21 thus become filled with barrier fluid, provided that the differential pressure is such that the level remains at or above weir 20. If the barrier fluid level is higher than weir 20, the level of fluid in trap pipe 21 follows the level in the annular container 3, until trap pipe 21 overflows into the vessel. The outlet of trap pipe 21 thereby defines the highest possible fluid level in annular container 3. The fluid in trap pipe 21 can be lower, depending on the differential pressure between the vessel and the outside, and generally the opposite legs of trap pipe 21 seek the same levels as the levels of the barrier fluid on opposite sides of the seal. The barrier fluid in the trap pipe 21 seals the differential pressure between vapor 16 and the ambient in a manometric manner, and in the same way as the barrier fluid in the annular container 3.

The radially outer part of annular container 3 is vented to ambient, which can occur around the shaft or through a venting passage or vent pipe 24 as shown. It may be desirable to prevent the process fluid from evaporating to the ambient. In this embodiment the process fluid functions as a barrier fluid and thus is exposed to vessel pressure and ambient pressure on opposite sides of the seal. The pressure applied on the radially outer part of the seal can be kept at ambient level while minimizing the release of process fluid vapor into the ambient, by providing vent pipe 24 with a cooler 23 such as a heat exchanger coupled to a heat sink at a temperature low enough to promote condensation. As discussed above, the cooler can be a heat exchanger to ambient if the ambient temperature is low enough, or can be coupled to a chiller or the like. If ambient temperature allows, the cooler 19 may be eliminated.

To further minimize evaporation of process fluid or escape of process fluid vapor to the ambient, any gap 22 between the rotating shaft 2 and the ambient can be reduced or closed using a seal cover 25 having a close clearance gap or which bears against the shaft.

We claim:

1. A seal for maintaining a hydrostatic barrier between a movable element and a wall that is traversed by the movable element and at least partly bounds a vessel, comprising:

an annular container formed by spaced axially extending walls and an end, for containing a barrier fluid;

a cup-shaped substantially cylindrical part having an axially extending cylindrical wall, wherein the walls of the container and the cylindrical part are radially spaced and axially overlapped, such that the cylindrical part extends into the annular container and has an edge submerged in the barrier fluid, wherein one of said annular container and said cylindrical part is joined to the vessel and the other is joined to the movable element;

wherein at least one of the walls of the annular container has at least one baffle extending radially into the barrier fluid.

2. The seal of claim 1, wherein the movable element is rotatable on a substantially vertical axis extending through the wall bounding the vessel, and wherein the at least one baffle comprises at least one baffle extending radially and circumferentially.

3. The seal of claim 2, comprising at least two horizontal baffles attached to the annular container.

4. The seal of claim 2, comprising at least two horizontal baffles on each facing wall of the annular container.

5. The seal of claim 1, wherein the movable element is rotatable on a substantially vertical axis extending through the wall bounding the vessel and wherein the at least one baffle comprises at least one baffle extending radially and axially.

6. The seal of claim 5, comprising at least eight vertically extending baffles spaced around a circumference of the annular container.

7. The seal of claim 5, comprising at least eight vertically extending baffles on each facing wall of the annular container.

8. The seal of claim 1, wherein the movable element comprises a shaft on a rotation axis extending substantially vertically into the vessel and wherein the at least one baffle comprises a plurality of baffles extending radially and axially, thereby obstructing rotation of the barrier fluid relative to the shaft, and radially and circumferentially, thereby reducing an efficiency of mixing in a direction parallel to the axis.

9. The seal of claim 1, further comprising a vapor condenser operable to condense a vapor from the vessel and to add condensed vapor to the barrier fluid.

10. The seal of claim 9, wherein the vapor condenser comprises a condenser pipe submerged in the barrier fluid.

11. The seal of claim 9, further comprising a vent pipe coupled between the barrier fluid an ambient.

12. The seal of claim 9, wherein the shaft is further sealed to a stationary seal cover across a close clearance gap confining the annular container.

13. The seal of claim 1, further comprising a discharge for excess barrier fluid, comprising a trap pipe fed through a weir from the barrier fluid, the trap pipe having a U-shaped section extending below a level of the barrier fluid.

14. The combination of claim 1, further comprising a vapor condenser operable to condense a vapor from the vessel in a condenser pipe having an end submerged in the barrier fluid, and a barrier fluid discharge having a trap pipe fed through a weir from the barrier fluid, the trap pipe having a U-shaped section extending below a level of the barrier fluid and discharging into the vessel.

15. In combination, a rotational shaft, a vessel and a seal, comprising:

the vessel having a vessel wall movably traversed by the shaft extending through an opening in the vessel wall, the vessel defining a volume containing a vapor at an internal pressure;

an annular container attached to the vessel wall at the opening, the annular container having a central opening admitting the shaft and radially inner and outer walls extending axially along the shaft, joined by an annular bottom;

a cup-shaped cylinder attached to the shaft, the cup-shaped cylinder having a cylinder wall extending between the inner and outer walls of the annular container and a lip extending below a surface of a barrier fluid in the annular container; and, at least one baffle mounted on the annular container and extending radially into the barrier fluid.

16. The combination of claim 15, comprising a plurality of baffles on the annular container extending into the barrier fluid, the baffles including vertical baffles extending radially and axially, thereby obstructing rotation of the barrier fluid relative to the shaft, and horizontal baffles extending radially and circumferentially, thereby reducing an efficiency of mixing in a direction parallel to the axis.

17. The combination of claim 16, comprising at least eight vertically extending baffles spaced around a circumference of the annular container on at least one of the walls of the annular container.

18. The combination of claim 17, comprising at least eight vertically extending baffles on each facing wall of the annular container and at least two horizontally extending baffles on each facing wall of the annular container.

* * * * *